March 22, 1927.
E. P. WEBSTER
1,621,859
CONVEYER CHAIN
Original Filed April 12, 1922
4 Sheets-Sheet 1

ELEVATION

INVENTOR
E. P. Webster.
BY
E. W. Anderson
ATTORNEY

March 22, 1927.

E. P. WEBSTER 1,621,859

CONVEYER CHAIN

Original Filed April 12, 1922   4 Sheets-Sheet 2

SECTION A-A

INVENTOR
E. P. Webster.
BY
E. W. Anderson Jr.
ATTORNEYS

March 22, 1927.  E. P. WEBSTER  1,621,859

CONVEYER CHAIN

Original Filed April 12, 1922   4 Sheets-Sheet 3

PLAN

INVENTOR
E. P. Webster
BY
E. W. Anderson
ATTORNEY

Patented Mar. 22, 1927.

1,621,859

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

CONVEYER CHAIN.

Application filed April 12, 1922, Serial No. 552,037. Renewed February 15, 1926.

Figure 5:
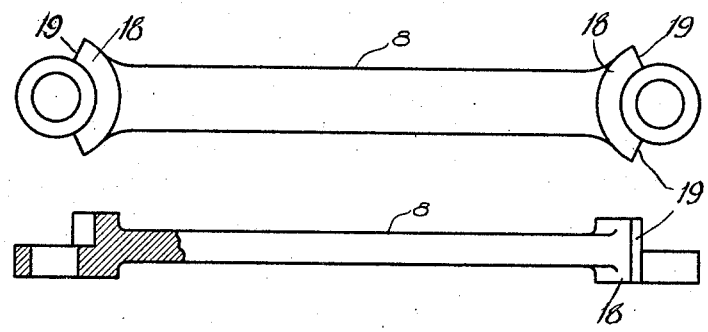

Figure 5 includes detail side and plan views of one of the links of the supplementary chain, the latter view being partly sectional.

The invention has relation to improved means, in connection with endless conveyer chains or belts having pans or trays, for maintaining said trays in true horizontal position while being carried around the end sprockets or gears of the conveyer and at all times.

It has been customary hitherto in devices of this kind to maintain the trays in horizontal position by causing them to depend from the chain or by counterbalancing the trays, either method being objectionable in the present case wherein the trays must be freely accessible from above by mechanical devices (not shown) for removing the contents from the trays by a raking movement of the said devices working transversely of the chain or belt.

The invention consists in the novel construction and combinations of parts as set forth in the appended claims.

In the accompanying drawings illustrating the invention, the numeral 1 designates the endless conveyer chain or belt, 2 are the end sprocket wheels of said chain, and 3 are the pans or trays fast upon the shafts or pivots 4 of said chain, the links 5 of the chain having loose engagement with said pivots.

The transverse pivot rods of the conveyer chain links have upstanding lugs 4' fast thereon and carrying the aforesaid trays, the chain 1 being in duplicate, the pivot rods 4 connecting the same, and the trays being located slightly above the chain and between the duplicate chains.

The pivot rods 4 of the conveyer chain links are provided respectively at one or both ends thereof with depending crank extensions 6, having outturned ends 7, loosely engaged by and forming the pivots of links 8 of a supplementary sprocket chain 9, the links of the latter being respectively of the same length as the respective links of the chain 1, and the two chains being both endless and of the same length over all. The depending crank extensions 6 are all of the same length and the two chains so connected by the crank extensions 6 form a parallel movement chain couple whereof the links move in parallel and the crank extensions 6 move in parallel.

Journal boxes 11 are provided for the shafts 10 of the sprocket wheels 2, said boxes being slidable in guides of the framing 12, guide grooves 13 of the boxes being engaged by projections or ribs 14 of the framing.

The journal boxes are provided each with a depending eccentric 15, held stationary by said boxes, the latter being held stationary in their frame guides by suitable adjusting screws (not shown).

Each eccentric 15 is provided with a sprocket wheel or annulus 16 loose thereon and having seats 17 engaged by the end heads 18 of the links 8.

The eccentrics 15 have their centers 15' in the same vertical lines or planes as the axial centers of the shafts 10, this relation being constant and any movement of the boxes 11 by said tension adjusting screws causing no change in said relation owing to the shaft 10 and the eccentric 15 being thereby simultaneously moved.

The chains 1 and 8 being engaged with the sprocket wheels 2 and 9, and the chain 2 being driven by suitable means as in my copending application S. No. 560,134, filed May 11, 1922, for cereal depositing and baking machine, the links of the two chains will have a parallel movement at all times, and when passing around the sprocket wheels 2 and 16, at which times the links of the two chains will close in upon each other in parallel. The depending crank extensions 6, will be held truly vertical at all times and when passing around the eccentric sprocket wheels 16, thereby always holding the trays in true horizontal position. It will of course be understood that the radial distance from the center of each eccentric 15 to the center of the pivot of the link 8 engaged in a seat 17 is the same as the distance from the center of the shaft 10 to the center of the pivot 4 of the link 5 engaged with the sprocket wheel 2. In other words the sprocket wheels 2 and 16 are of the same radial measurement.

It will be further understood that the sprocket wheels 16 serve as guide sprockets or idlers and are adapted to prevent folding movement of the supplementary chain that would throw the trays out of horizontal position.

Figure 1:
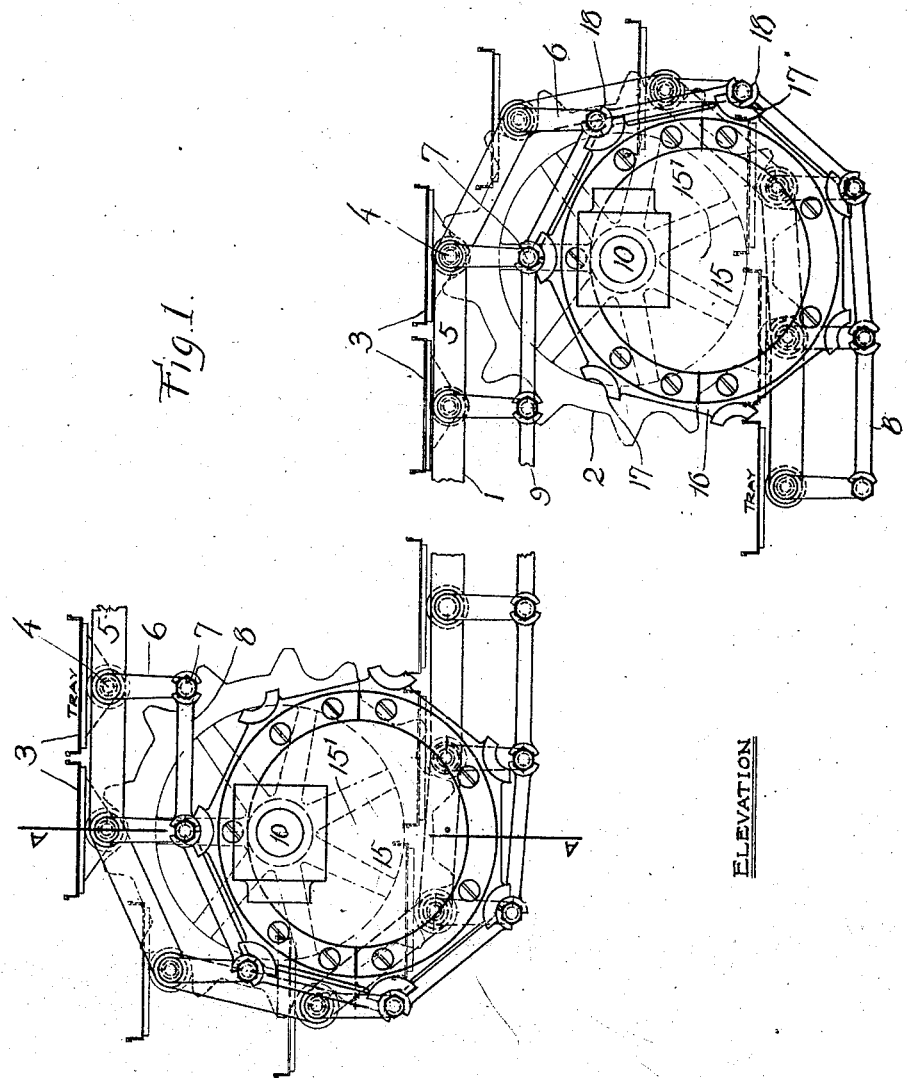
Figure 1 is a side view of the invention, the chain being partly broken away.
Figure 2:
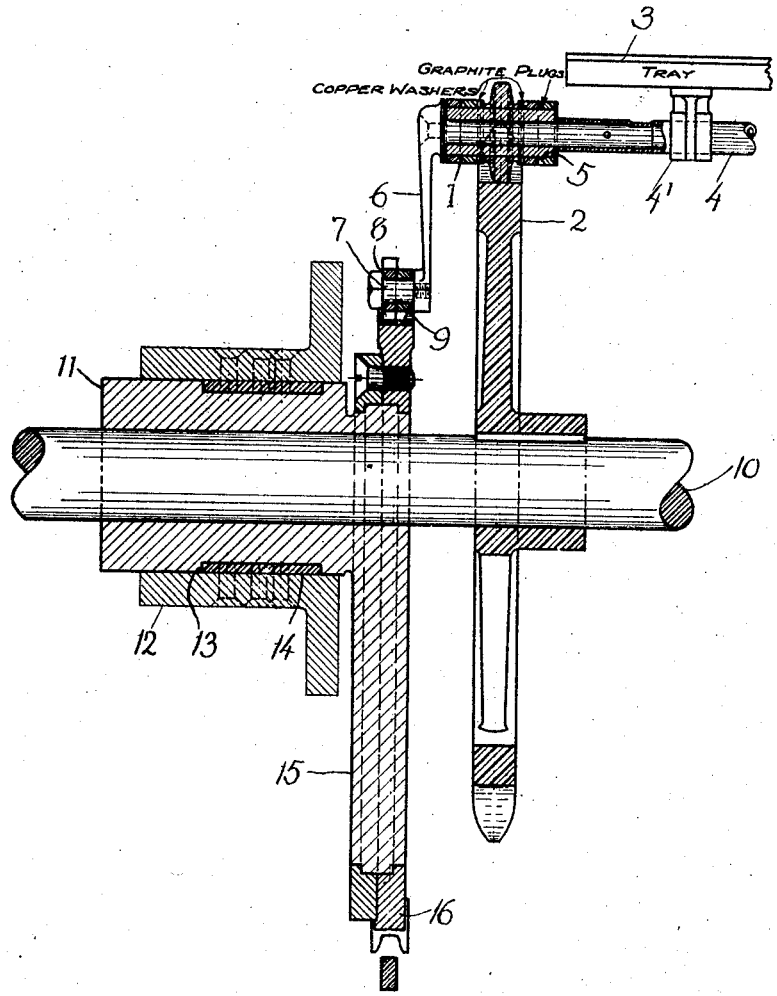
Figure 2 is a section on the line A—A Figure 1.
Figure 3:
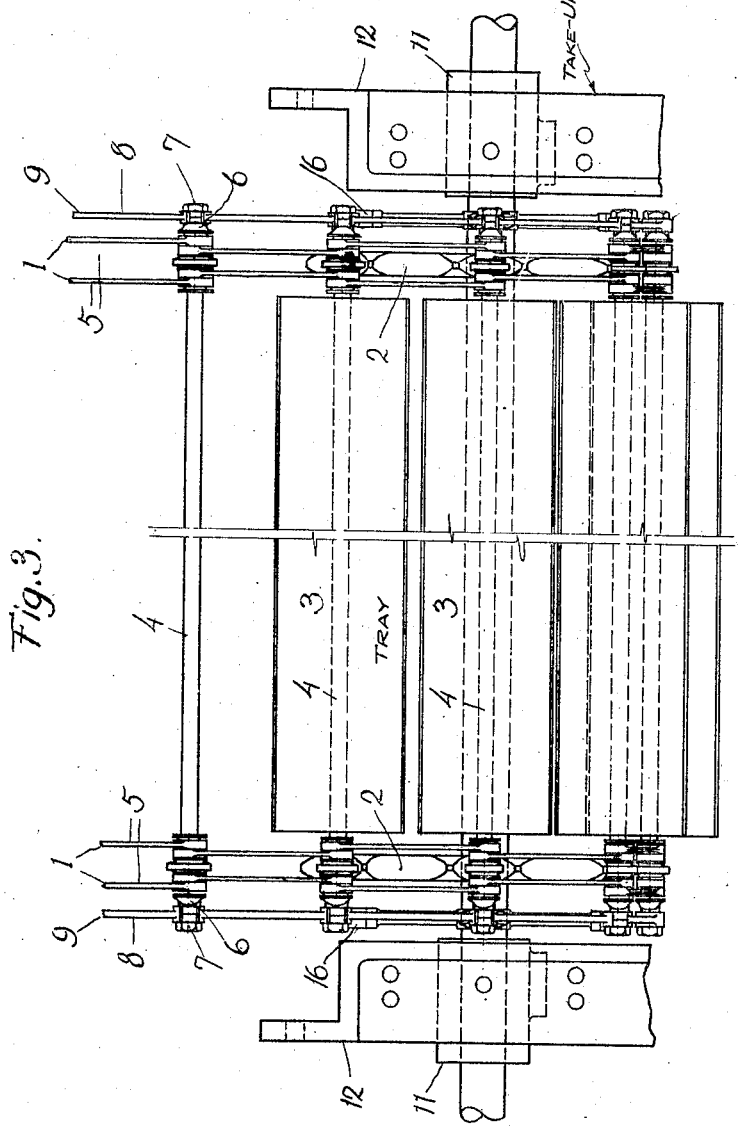
Figure 3 is a plan view of the invention, including one set only of the end sprocket wheels.
Figure 4:
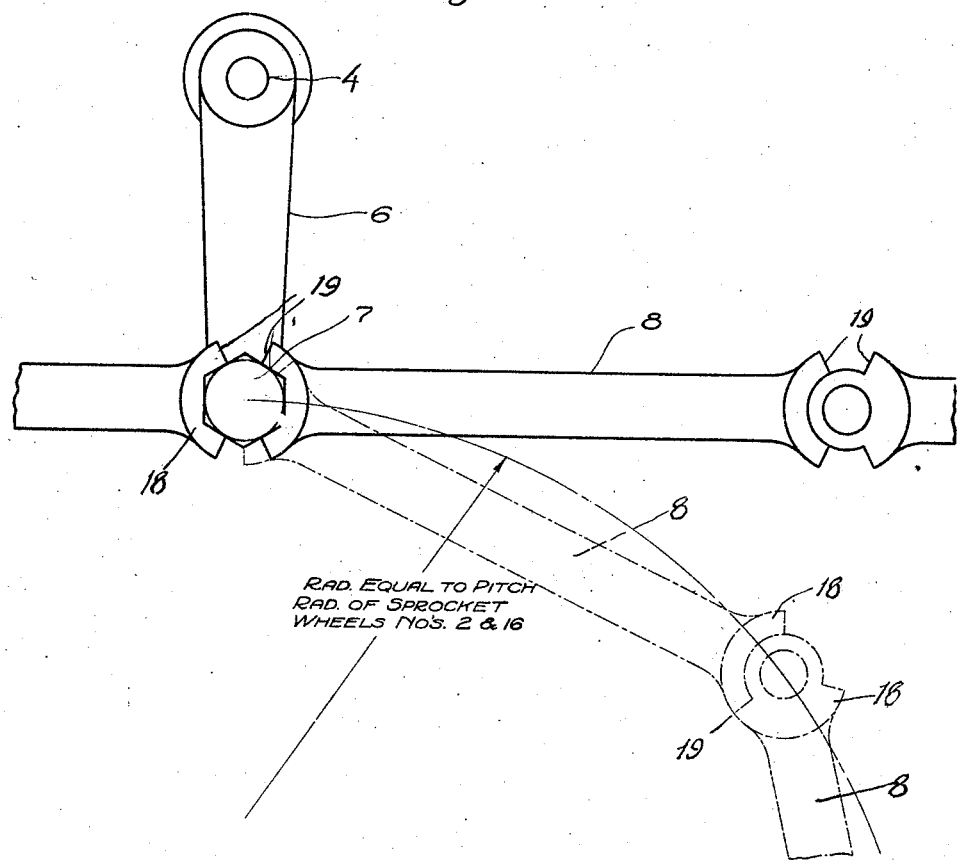
Figure 4 is a detail side view of the supplementary chain, with a diagrammatic showing in dotted lines of a bend in said chain corresponding to the bend thereof in passing around one of the guide sprocket wheels.

To further insure that there shall be no folding movement of the supplementary chain that would throw the trays out of horizontal position, the end heads 18 of the links 8 have angularly related radial shoulders 19, said shoulders of the adjacent end heads of adjacent links 8 contacting with each other as the supplementary chain passes around sprocket wheels 16 to limit the folding movement of the links. The links of the supplementary chain move pivotally towards each other in one direction in passing around one of the sprocket wheels 16 and in the opposite direction in passing around the sprocket wheel 16 at the opposite end of the conveyer, and the radial shoulders 19 contact with each other to limit the pivotal movement of the links of the chain in both said directions, as shown in Figure 1 of the drawings.

As before stated it is common to use counterbalancing devices for the trays to hold the trays in horizontal position, and in the present case were counterbalancing devices alone used for this purpose the objection would be that the conveyer chain would be unduly weighted thereby.

The supplementary chain 9 of the present case and the crank extensions 6 are to some extent counterbalancing devices tending to hold the trays in horizontal position, but much lighter in weight than would be needed for proper counterbalancing action.

I claim:—

1. In a conveyer, an endless conveyer chain having end sprockets, trays carried by said chain, and means for maintaining said trays in horizontal position including crank extensions of the pivots of the links of said chain, and a supplementary chain having pivot studs mounted at the outer ends of said crank extensions, the links of the supplementary chain embodying means acting independently to limit the pivotal movement thereof towards each other in both directions in accord with the arcs assumed by the chains in the passage of the conveyer chain around said end sprockets.

2. In a conveyer, an endless horizontal conveyer chain having end sprockets and pivots provided with upstanding elements and trays carried by said upstanding elements and located above said chain, and means for maintaining said trays in horizontal position including depending vertical crank extensions of said pivots and a supplementary horizontal chain having pivot studs mounted at the lower ends of said crank extensions, the links of said supplementary chain embodying means acting independently to limit the pivotal movement thereof towards each other in both directions in accord with the arcs assumed by the chains in the passage of the conveyer chain around said end sprockets.

3. In a conveyer, an endless conveyer chain having end sprockets, trays carried by said chain, and means for maintaining said trays in horizontal position including crank extensions of the pivots of the links of said chain, a supplementary sprocket chain having pivot studs mounted at the outer ends of said crank extensions, and eccentric sprocket wheels for the supplementary chain, the links of the supplementary chain having ends provided with angularly related radial shoulders contacting in the pivotal movement of said links towards each other in both directions in the passage thereof around said eccentric sprockets.

4. In a conveyer, duplicate endless horizontal conveyer chains having end sprockets and transverse pivot rods provided with upstanding lugs and trays carried by said lugs and located above said chains, and means for maintaining said trays in horizontal position including depending vertical crank extensions of said pivot rods, supplementary duplicate horizontal chains located below and vertically spaced from said conveyer chains and having pivot studs mounted at the lower ends of said crank extensions, and eccentric sprocket wheels for said supplementary chains, the links of said supplementary chains having ends provided with angularly related radial shoulders contacting in the pivotal movement of said links towards each other in both directions in the passage thereof around said eccentric sprockets.

In testimony whereof I affix my signature.

EARL P. WEBSTER.